US012696032B2

(12) United States Patent
Kando

(10) Patent No.: US 12,696,032 B2
(45) Date of Patent: Jul. 28, 2026

(54) IMAGE PICKUP APPARATUS HAVING MICROPHONES

(71) Applicant: CANON KABUSHIKI KAISHA, Tokyo (JP)

(72) Inventor: Ryohei Kando, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 18/628,982

(22) Filed: Apr. 8, 2024

(65) Prior Publication Data

US 2024/0348976 A1     Oct. 17, 2024

(30) Foreign Application Priority Data

Apr. 11, 2023    (JP) ................................. 2023-064315

(51) Int. Cl.
| | |
|---|---|
| *H04R 1/40* | (2006.01) |
| *G03B 29/00* | (2021.01) |
| *G03B 31/00* | (2021.01) |
| *H04R 1/02* | (2006.01) |
| *H04R 1/28* | (2006.01) |

(52) U.S. Cl.
CPC ............. *H04R 1/406* (2013.01); *G03B 29/00* (2013.01); *G03B 31/00* (2013.01); *H04R 1/028* (2013.01); *H04R 1/2876* (2013.01); *H04R 2201/401* (2013.01); *H04R 2410/01* (2013.01); *H04R 2420/07* (2013.01); *H04R 2499/11* (2013.01)

(58) Field of Classification Search
CPC .... H01R 1/406; H01R 2410/01; H01R 1/028; G03B 29/00; G03B 31/00; H04R 1/406; H04R 2410/01; H04R 2410/05; H04R 1/028
See application file for complete search history.

(56) References Cited

U.S. PATENT DOCUMENTS

| | | | | |
|---|---|---|---|---|
| 2012/0224716 A1* | 9/2012 | Ohtsuka | ................. | H04N 23/51 |
| | | | | 381/92 |
| 2024/0027797 A1* | 1/2024 | Song | ...................... | G03B 30/00 |
| 2024/0276145 A1* | 8/2024 | Toriumi | ................. | H04S 3/002 |

FOREIGN PATENT DOCUMENTS

| | | | | | |
|---|---|---|---|---|---|
| JP | 2008283521 | A | * | 11/2008 | |
| JP | 6748848 | B2 | | 3/2018 | |
| WO | WO-2022215934 | A1 | * | 10/2022 | ............. G02B 27/01 |

* cited by examiner

*Primary Examiner* — Christopher E Mahoney
(74) *Attorney, Agent, or Firm* — Cowan, Liebowitz & Latman, P.C.

(57) ABSTRACT

An image pickup apparatus in which three microphone units are arranged with high space efficiency. The image pickup apparatus comprises a lens barrel having an optical axis, a first microphone unit disposed to a left of the optical axis in a left-right direction when viewed from an optical axis direction, a second microphone unit disposed to a right of the optical axis in the left-right direction, and a third microphone unit disposed between the first microphone unit and the second microphone unit in the left-right direction, wherein when viewed from the optical axis direction, a lower end position of the first microphone unit and a lower end position of the second microphone unit are lower than an upper end position of the lens barrel and a lower end position of the third microphone unit is higher than the upper end position of the lens barrel.

17 Claims, 10 Drawing Sheets

IMAGE PICKUP APPARATUS HAVING MICROPHONES

BACKGROUND OF THE INVENTION

Field of the Invention

The present invention relates to an image pickup apparatus having microphones.

Description of the Related Art

Conventionally, in the field of cameras including microphones, a camera including a reference microphone unit, which is mounted for reducing recording of internal noise in a housing (e.g., lens driving sound) through a main microphone unit, in addition to the main microphone unit for external voice acquisition is known.

For example, Japanese Patent No. 6748848 discloses an apparatus including three microphones, which reduces internal noise acquired by two main microphone units, by using one reference microphone unit. According to this apparatus, the internal noise is reduced by comparing detected signals acquired by the main microphone units disposed near openings outside and the reference microphone unit disposed inside a housing. Specifically, the internal noise can be reduced by obtaining a noise component based on a sound signal acquired from the reference microphone unit and subtracting the noise component from sound signals acquired from the main microphone units.

In the apparatus disclosed in Japanese Patent No. 6748848, however, same type of microphone elements are used for the main microphone units and the reference microphone unit. As a result, there is a possibility that a housing size increases as sizes of the microphone units increases. For example, since a lens barrel has a cylindrical shape, a space above the lens barrel is narrow. Therefore, in a case where the microphone units are arranged in an area between a camera upper surface and the lens barrel, it may be necessary to design an entire camera to be enlarged in a height direction in order to accommodate the microphone units. As a result, to arrange the three microphones in the camera, ideas for improving space efficiency are required.

SUMMARY OF THE INVENTION

The present invention provides an image pickup apparatus in which three microphone units are arranged with high space efficiency.

Accordingly, the present invention provides an image pickup apparatus comprising a lens barrel having an optical axis, a first microphone unit disposed to a left of the optical axis in a left-right direction when viewed from an optical axis direction, a second microphone unit disposed to a right of the optical axis in the left-right direction, and a third microphone unit disposed between the first microphone unit and the second microphone unit in the left-right direction, wherein, when viewed from the optical axis direction, both of a lower end position of the first microphone unit and a lower end position of the second microphone unit are lower than an upper end position of the lens barrel and a lower end position of the third microphone unit is higher than the upper end position of the lens barrel.

According to the present invention, the three microphone units can be arranged in the image pickup apparatus with the high space efficiency.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
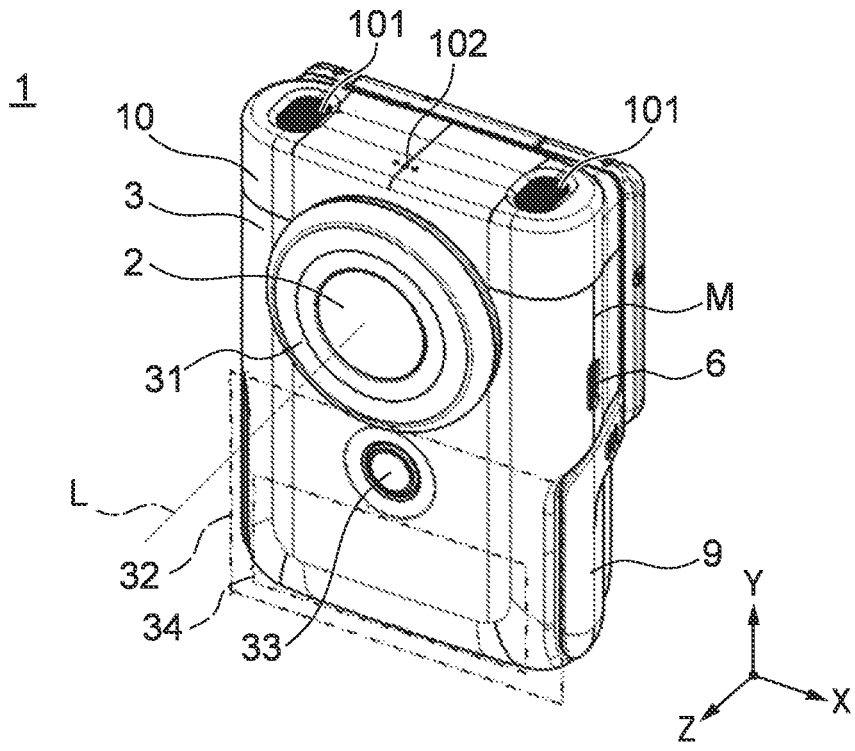
FIGS. 1A to 1C are a front perspective view, a rear perspective view, and a bottom view of a camera, respectively.
Figure 1B:
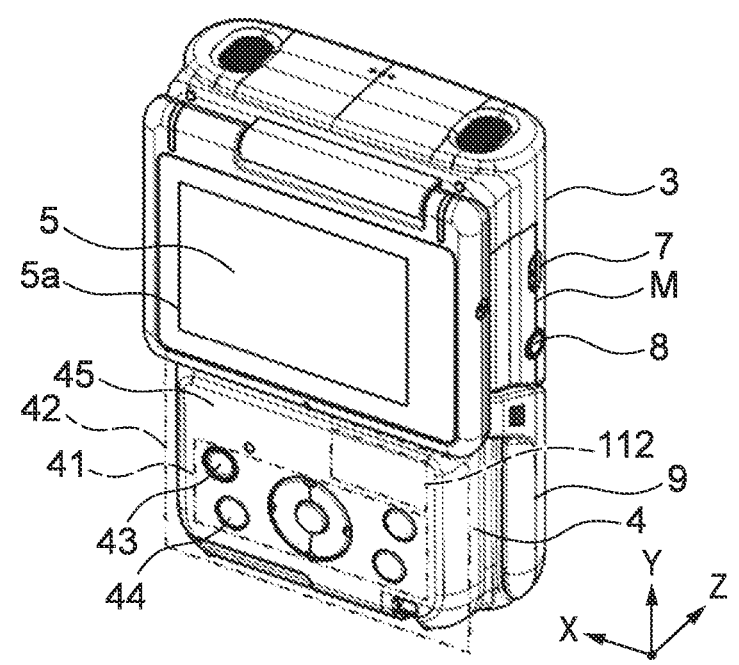

FIGS. 1A and 1B are perspective views of an image pickup apparatus according to an embodiment of the present invention. In the present embodiment, a camera 1 is exemplified as the image pickup apparatus. An optical axis of lens barrel unit (lens barrel) 2 included in the camera 1 is referred to as an "optical axis L".

Figure 1C:
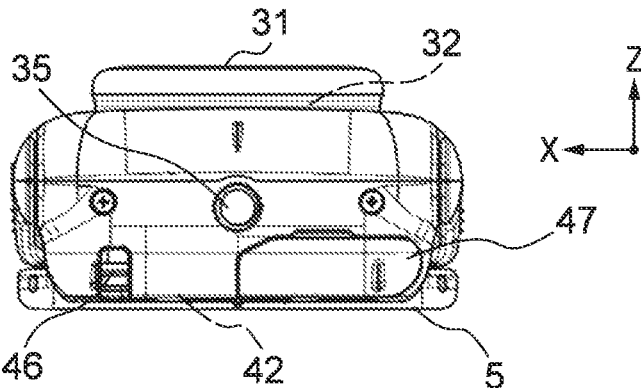

For convenience, directions of the respective units will be referred to as follows with reference to X, Y, and Z coordinate axes. In a direction parallel to the optical axis L (Z direction), an object side is referred to as a front direction. Therefore, a +Y direction is an upward direction, and a +Z direction is the front direction. The Y direction is also referred to as a height direction of the camera 1. The +X direction is a left direction as viewed from a photographer (user) (a right direction as viewed from the object side), and is defined as "left (direction)" used in the description. Therefore, FIG. 1A is a front perspective view of the camera 1. FIG. 1B is a rear perspective view of the camera 1. FIG. 1C is a bottom view of the camera 1.

The lens barrel unit 2 including an imaging optical system is disposed in front portion of the camera 1. The lens barrel unit 2 is a fixed single focal length lens, and is a known lens barrel in which a shutter mechanism, a focusing mechanism, and the like are mounted. The lens barrel unit 2 is not extended when the user only turning on a power (switching to use state).

The appearance of a front surface of the camera 1 is formed by a front surface cover 3. On an outer periphery of the lens barrel unit 2, a front surface ring 31 protruding toward the +Z side from the front surface cover 3 is provided. On the −Y side of the front surface ring 31, a front surface grip area 32 is provided to be gripped by the user when the user holds the camera 1. That is, the front surface grip area 32 is disposed below the lens barrel unit 2. The front surface ring 31 protrudes relative to the front surface grip area 32. As a result, the user can easily grip the front surface grip area 32. Specifically, the protruding front surface ring 31 serves as a guide when the user grips the front surface grip area 32. Therefore, a hand gripping the front surface grip area 32 is less likely to enter an angle of view of the lens barrel unit 2.

A start/stop button 33 is disposed at a higher position in the +Y direction in the front surface grip area 32. Shooting starts when the start/stop button 33 is pressed, and the shooting finishes when the start/stop button is pressed again. A space on the −Y side below the start/stop button 33 in the front surface grip area 32 is a front surface finger placing space 34 for placing a finger when the user grips the front surface grip area 32.

An appearance of a back surface of the camera 1 is formed by a back surface cover 4. A display unit 5 and a back surface operation member 41 are provided on the back surface side of the camera 1. The display unit 5 comprises a thin film transistors (TFT) type liquid crystal display (LCD) or the like, and includes a touch panel 5a capable of detecting a user's touch operation. When the camera 1 is powered on and set to a still image mode or a moving image mode, an image signal of an object image captured by an image pickup device (not illustrated) is transmitted to the display unit 5, and a through image is displayed on the display unit 5.

Figure 2A:
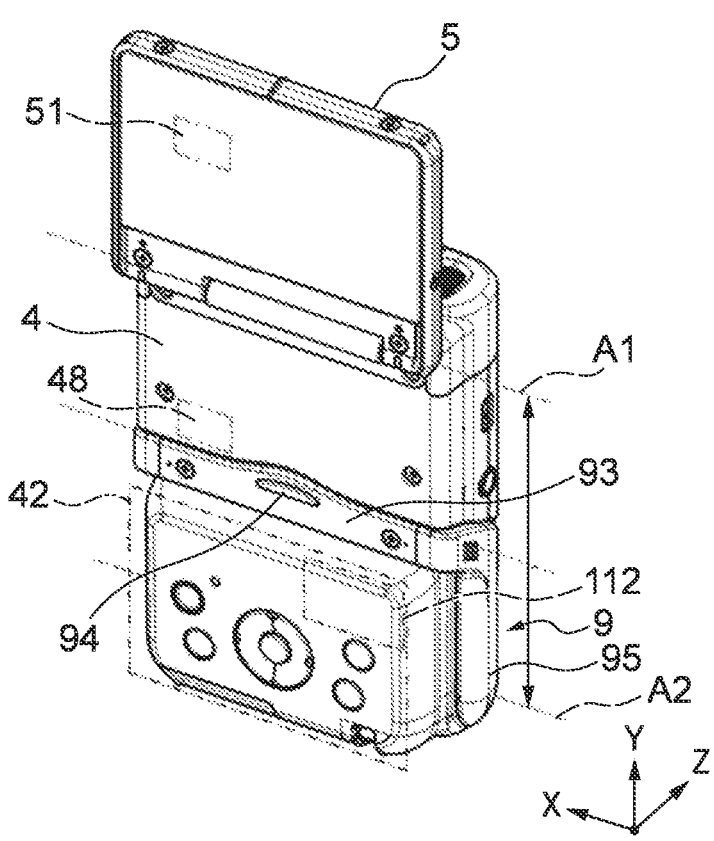
FIGS. 2A and 2B are rear perspective views of the camera.
Figure 3A:
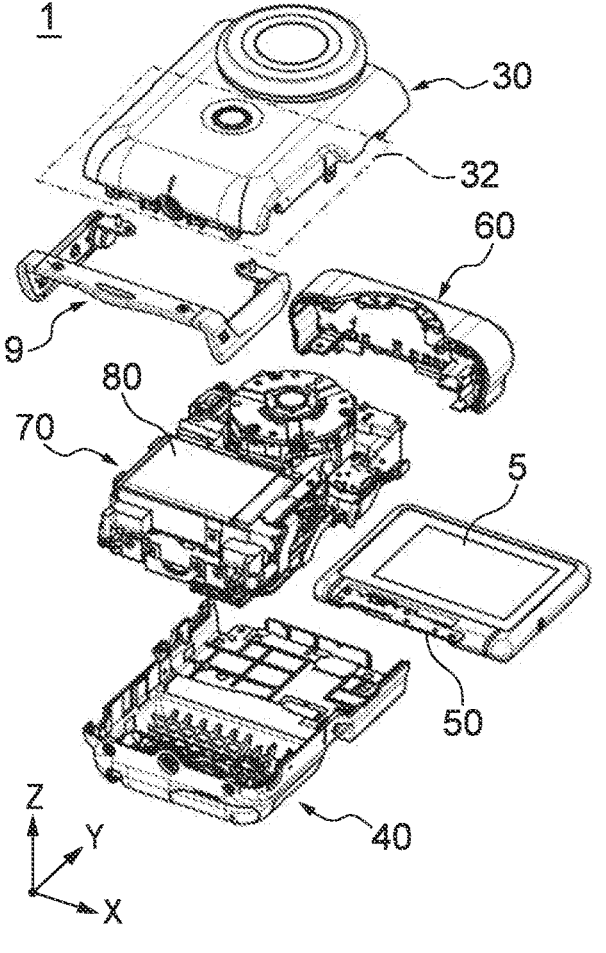
FIG. 3A is a front exploded perspective view illustrating an exterior unit configuration of the camera.

In addition, the display unit 5 is connected to a camera body by a display unit hinge 50 (FIG. 3A). The display unit hinge 50 has a display unit rotation axis A1 (FIG. 2A) substantially parallel to the X direction, and the display unit 5 is rotatable approximately 180° about the display unit rotation axis A1 relative to the camera body. As a result, when the user holds the camera 1 and takes selfie to shoot an image of the user, the user can shoot the image while checking a composition on the display unit 5.

On the −Y side of the display unit 5, a back surface grip area 42, which is a portion recessed toward the +Z side from the display unit 5 and is gripped when the user holds the camera 1, is provided. The back surface grip area 42 is disposed on the −Y side relative to the lens barrel unit 2. That is, the back surface grip area 42 is disposed below the lens barrel unit 2. The display unit 5 protrudes relative to the back surface grip area 42. As a result, the user can easily hold the back surface grip area 42. Specifically, the protruding display unit 5 serves as a guide when the user grips the back surface grip area 42. Therefore, a hand holding the back surface grip area 42 is less likely to enter an area of the touch panel 5a of the display unit 5.

The back surface operation member 41 is disposed in a portion on the −Y side in the back surface grip area 42. The back surface operation member 41 includes a power button 43 for switching on/off of the camera 1, a playback button 44 for instructing a playback of a recorded captured image, and the like. A space on the +Y side of the back surface operation member 41 in the back surface grip area 42 is a back surface finger placing space 45 for placing a thumb when the user grips the back surface grip area 42.

Regarding an arrangement in the Y direction when viewed from the X direction, the start/stop button 33 is positioned in an area corresponding to the back surface finger placing space 45, and the back surface operation member 41 is positioned in an area corresponding to the front surface finger placing space 34. With such the arrangement, the user is allowed to perform an operation by sandwiching a corresponding operation member and a finger placing space with a thumb and a finger, and therefore a reliable pressing operation can be performed.

An appearance of side surfaces of the camera 1 is formed by the front surface cover 3 and the back surface cover 4. Jacks (terminals) such as a USB connector 6, a high-definition multimedia interface (HDMI (registered trademark)) connector 7, and a microphone input terminal 8 are disposed at a position M where the front surface cover 3 and the back surface cover 4 are connected in the Z direction. Each jack is disposed on the +Y side relative to the front surface grip area 32 and the back surface grip area 42. With such the arrangement, when the user holds (grips) the camera 1 or places the camera 1 on a desk or the like, a cable inserted into each jack does not become an obstacle, and usability is high.

A stand 9 is provided in a lower half of the camera 1. The appearance of the side surface of the camera 1 is formed by stand side surface covers 95 and 96 (FIG. 2B) of the stand 9. In a retracted state of the stand 9, the stand side surface covers 95 and 96 have substantially identical shape as side surface shapes of the front surface cover 3 and the back surface cover 4. Therefore, there is no feeling of strangeness in appearance, and it does not interfere the user when the user holds the camera 1. The stand 9 is rotatable about a stand rotation axis A2 (FIG. 2A) substantially parallel to the X direction. Since the camera 1 can be tilted by using the stand 9, it is possible to take images at various postures while the camera 1 is placed on the desk or the like.

An appearance of a top portion of the camera 1 is formed by a top surface cover 10. Microphone holes 101 for microphones, which are symmetrically disposed on both sides about the optical axis L of the lens barrel unit 2, and speaker holes 102 for a speaker, which are symmetrically disposed on both sides about the optical axis L of the lens barrel unit 2 are provided on a top surface of the top surface cover 10. The speaker playbacks an operation sound and a sound of a captured moving image. Since the microphone holes 101 are located on the top surface of the camera 1, it is possible to reduce a difference in sound collection performance when the sound arrived from the front side (+Z side) and the sound arrived from the back side (−Z side) of the camera 1 are collected.

A wireless module 112 (wireless device) is disposed inside the camera 1 corresponding to the back surface grip area 42 (FIG. 1B). By disposing the wireless module 112 in the back surface grip area 42, its distance from the microphones (first microphone unit MC1, second microphone unit MC2, and third microphone unit MC3 to be described later) disposed above the lens barrel unit 2 can be increased. As a result, the possibility that noise of a radio signal is mixed in a sound electric signal is reduced.

A tripod mount portion 35 for mounting an accessory such as a tripod, a strap mount portion 46 for passing a strap string, and a media cover 47 are provided on a bottom surface of the camera 1 (FIG. 1C). The media cover 47 is attached to the camera body so as to be openable and closable. When the media cover 47 is opened, a recording medium (not illustrated) as an external memory can be attached to and detached from the camera 1.

Figure 2B:
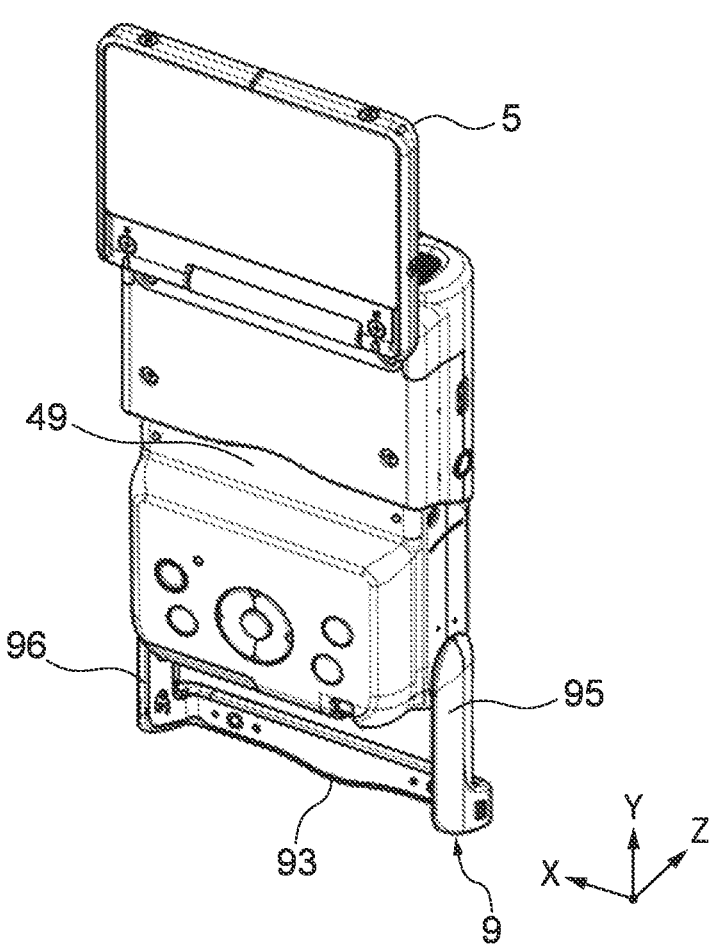

Operations of the display unit 5 and the stand 9 will be described with reference to FIGS. 2A and 2B. FIG. 2A is a rear perspective view of the camera 1 in which the display unit 5 is in an open state and the stand 9 is in a retracted state. FIG. 2B is a rear perspective view of the camera 1 in which the display unit 5 is in the open state and the stand 9 is in an erected state.

By rotating the display unit 5 about the display unit rotation axis A1, the display unit 5 can be transferred between the retracted state illustrated in FIGS. 1A and 1B and the open state illustrated in FIGS. 2A and 2B. When the display unit 5 is rotated about the display unit rotation axis A1 by approximately 180° from the retracted state, the display unit 5 is brought into the open state. By rotating the stand 9 about the stand rotation axis A2, the stand 9 can be transferred between the retracted state illustrated in FIGS. 1A, 1B, and 2A and the erected state illustrated in FIG. 2B. When the stand 9 is rotated about the stand rotation axis A2 by approximately 180° from the retracted state, the stand 9 is brought into the erected state.

A magnet 51 is disposed inside the display unit 5, and a yoke 48, which is a magnetic body, is disposed inside the back surface cover 4. When the display unit 5 is transferred from the open state to the retracted state, the display unit 5 receives a mechanical attracting force (suction force) by the display unit hinge 50 (FIG. 3A) and a magnetic attracting force by the magnet 51 and the yoke 48. By these forces, the display unit 5 automatically moves (transitions) from a predetermined angle to the retracted state.

The stand 9 is configured such that the stand side surface cover 95 and the stand side surface cover 96 are connected by a stand intermediate cover 93, and these covers rotate integrally. A cushion member 94 (FIG. 2A) is disposed on the stand intermediate cover 93 in order to reduce a collision sound generated when the display unit 5 is transferred to the retracted state.

In the back surface cover 4, a housing portion 49 is formed at a position that is an area hidden by the display unit 5 in the retracted state of the display unit 5 and is on the +Y side of the back surface grip area 42. The housing portion 49 houses the stand intermediate cover 93. The display unit rotation axis A1 and the stand rotation axis A2 are substantially parallel to the X direction, and are disposed near both ends of the camera 1 in the Y direction. When the stand 9 is in the retracted state, the stand intermediate cover 93 is located substantially at the center between the display unit rotation axis A1 and the stand rotation axis A2 in the Y direction.

Figure 3B:
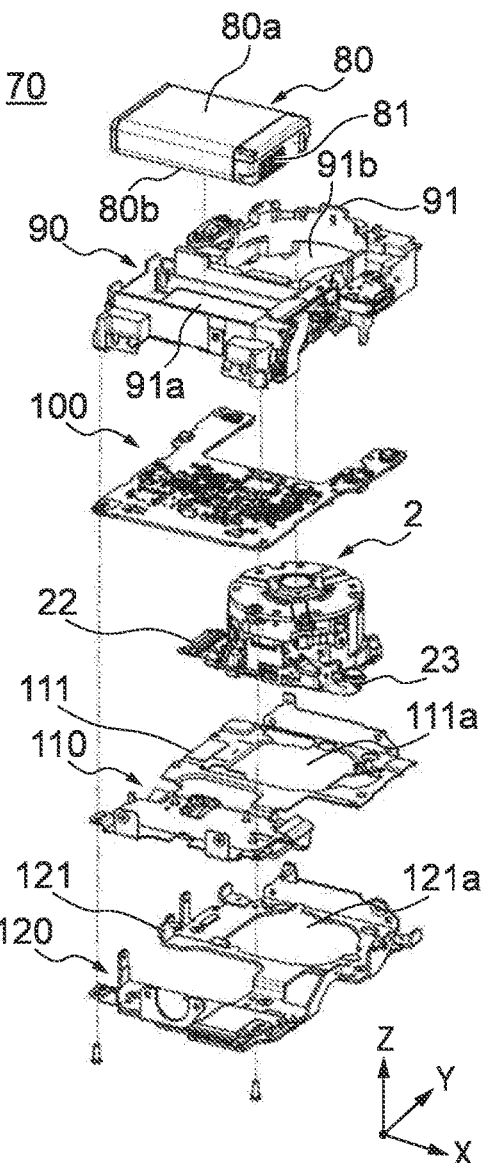
FIG. 3B is a front exploded perspective view of an internal structural unit.

An exterior unit configuration of the camera 1 will be described with reference to FIGS. 3A and 3B. FIG. 3A is a front exploded perspective view illustrating an exterior unit configuration of camera 1. FIG. 3B is a front exploded perspective view of an internal structural unit 70.

As illustrated in FIG. 3A, each exterior unit is assembled to the internal structural unit 70. The exterior units include a front surface cover unit 30, a back surface cover unit 40, a top surface cover unit 60, the display unit 5, and the stand 9. A battery 80 is housed and held in the internal structural unit 70.

As illustrated in FIG. 3B, the lens barrel unit 2, a main substrate 100, a back surface heat sink unit 110, and a main chassis unit 120 are assembled to a main base unit 90, thereby configuring the internal structural unit 70.

A main base 91 is formed of a resin material and is a component serving as a base of the main base unit 90. The battery 80 has a substantially rectangular parallelepiped shape, and has a first surface 80a and a second surface 80b that are substantially orthogonal to the Z direction. The main base 91 is formed with a battery chamber 91a in which battery 80 is housed and held, and a barrel chamber 91b in which the lens barrel unit 2 is housed and held. The battery chamber 91a is provided in an area overlapping with the front surface grip area 32 (FIG. 1A) when viewed from the Z direction.

The lens barrel unit 2 includes an image pickup device (not illustrated) that photoelectrically converts an optical image of an object formed through a plurality of taking lenses constituting an imaging optical system to generate image data. The image pickup device is constituted by a CCD, a CMOS image sensor, or the like, and is mounted on a sensor FPC 22.

Actuators (not illustrated) for a shutter mechanism, a focus mechanism, and the like are disposed inside the lens barrel unit 2, and each actuator is mounted on an actuator FPC 23. The back surface heat sink unit 110 includes a back surface heat sink 111, a wireless FPC (not illustrated), and a wireless module 112 (FIG. 1B). The back surface heat sink 111 is manufactured by pressing a sheet metal (aluminum, copper, or the like) having a high thermal conductivity and a high strength. The wireless module 112 has a wireless communication function to communicate with the outside. The wireless FPC communicably connects the wireless module 112 to the main substrate 100.

The main chassis unit 120 includes a main chassis 121 and a back surface operation board (not illustrated). The main chassis 121 is manufactured by pressing a sheet metal. The main chassis 121 is a ground member which is a structural framework of the camera 1 and serves as a main ground (GND). Switches of the back surface operation member 41 (FIG. 1B) are mounted on the back surface operation board.

An opening 121a is formed in the main chassis 121 so as to be positioned around the back surface of the image pickup device. A drawing shape 111a inserted into the opening 121a is formed in the back surface heat sink 111. The drawing shape 111a is disposed so as to fit within a thickness of the opening 121a of the main chassis 121. A back surface periphery of the image pickup device is positioned at a back end of the lens barrel unit 2. By inserting the drawing shape 111a of the back surface heat sink into the opening 121a, it is possible to diffuse heat from the image pickup device while suppressing an increase in the dimension of the camera 1 in the Z direction.

The lens barrel unit 2 is incorporated into the barrel chamber 91b of the main base 91 after the main substrate 100 is incorporated. Then, the sensor FPC 22 and the actuator FPC 23 are connected to the connectors of the main substrate 100. Then, the back surface heat sink unit 110 and the main chassis unit 120 are assembled into this assembly. Furthermore, the back surface heat sink unit 110 and the main chassis unit 120 are fastened to the main base 91 with a plurality of screws around the barrel chamber 91b.

The lens barrel unit 2 is sandwiched between the main base 91 and the main chassis 121 via an elastic member (not illustrated). Consequently, vibration caused by an actuator or the like in the lens barrel unit 2 hardly affects the microphones disposed in the camera 1.

Figure 4:
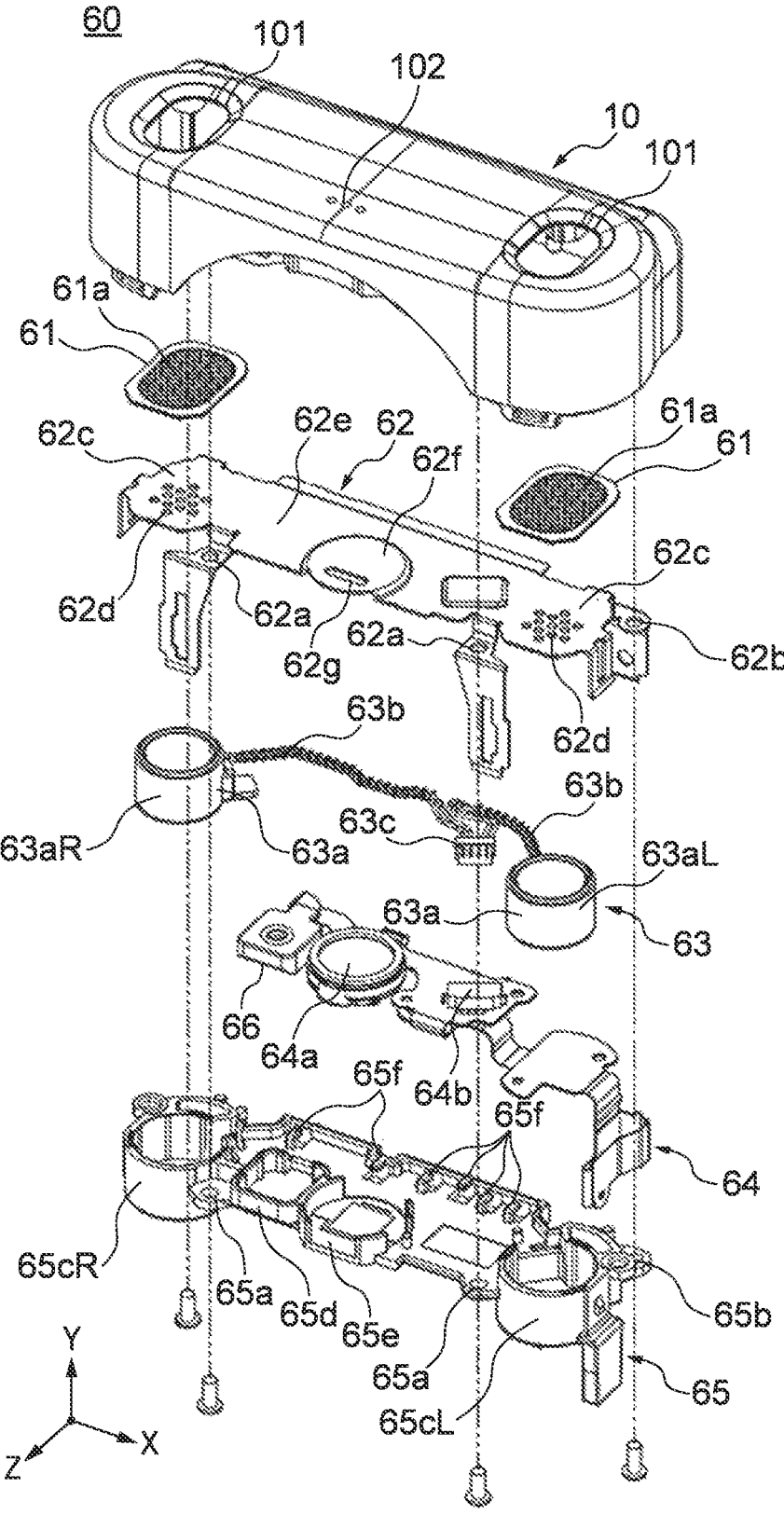
FIG. 4 is an upper perspective view of an upper surface cover unit.

A configuration of the top surface cover unit 60 will be described with reference to FIG. 4. FIG. 4 is a upper perspective view of the top surface cover unit 60.

The top surface cover unit 60 includes the top surface cover 10, two microphone sheets 61, a microphone/speaker pressing member 62, an LR microphone unit 63, a top surface FPC 64, a microphone/speaker holder 65, and a reference microphone unit 66.

The microphone sheets 61 are attached to the inside of the top surface cover 10 with a double-sided tape or the like so as not to inadvertently move. Furthermore, in order to acquire an external sound, each microphone sheet 61 is provided with a plurality of small punching holes 61a. By reducing the hole size of the punching hole 61a, sand and water are less likely to enter the inside of the camera 1.

The microphone/speaker pressing member 62 includes first screw seat surfaces 62a, second screw seat surfaces 62b, main microphone pressing portions 62c, a reference microphone pressing portion 62*e*, and a speaker pressing portion 62*f*. The first screw seat surfaces 62*a* and the second screw seat surfaces 62*b* are in contact with a boss seat surface (not illustrated) inside the top surface cover 10, and are fixed to the top surface cover 10 with screws. Each main microphone pressing portion 62*c* is provided with a plurality of microphone holes 62*d* in order to acquire an external sound. In addition, the speaker pressing portion 62*f* is provided with a speaker hole 62*g* for outputting a sound from a speaker 64*a* to the outside without loss.

The LR microphone unit 63 includes main microphone units 63*a* (63*a*L, 63*a*R), lead wires 63*b*, a connector 63*c*, and the like. In "LR" of the LR microphone unit 63, "L" is an abbreviation for Left, and "R" is an abbreviation for Right. One main microphone unit 63*a* is provided in each of left and right portions of the LR microphone units 63, wherein the main microphone unit 63*a*L is arranged in the left portion, and the main microphone unit 63*a*R is arranged in the right portion. It should be noted that the term "left and right" as used herein is defined as a direction in which the camera 1 is viewed from the back surface side (photographer side) as described above.

Figure 6A:
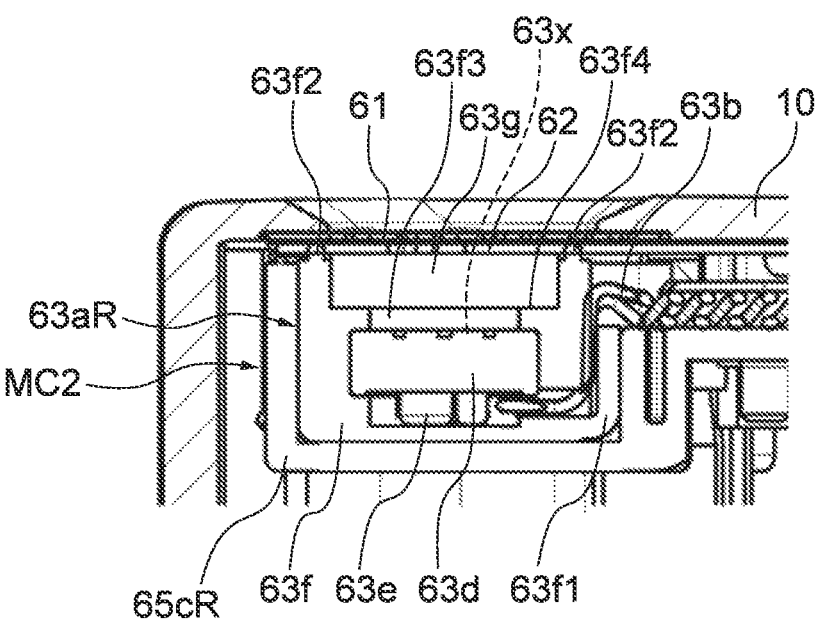
FIG. 6A is a cross-sectional view taken along the line A-A in FIG. 5.

Each of the main microphone units 63*a* includes a main microphone element 63*d* (FIG. 6A). The main microphone elements 63*d* input a main sound outside the camera 1 and convert the input main sound into electric signals (hereinafter, referred to as main sound signals). One lead wire 63*b* is wired from each of the positive electrode and the negative electrode of the main microphone element 63*d*, and the two lead wires are twisted for noise reduction. A total of four lead wires 63*b* wired from the main microphone elements 63*d* are grouped together at the connector 63*c*.

Figure 6B:
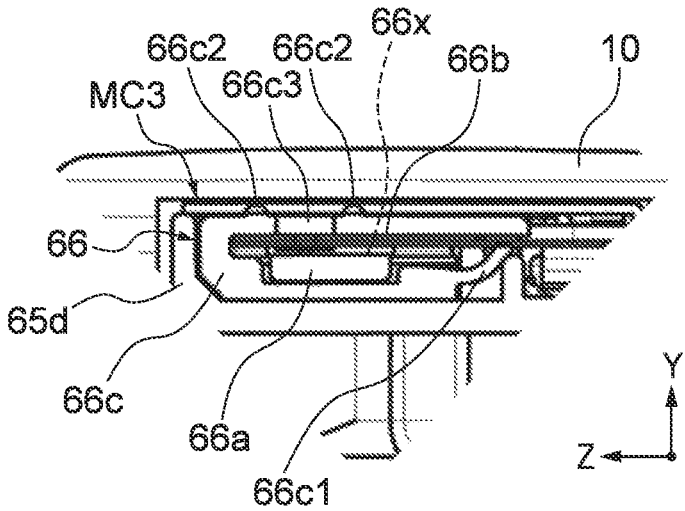
FIG. 6B is a cross-sectional view taken along the line B-B in FIG. 5.

The top surface FPC 64 includes the speaker 64*a*, a connector 64*b*, and the like. The reference microphone unit 66 connected to the top surface FPC 64 includes a reference microphone element 66*a* (FIG. 6B). The reference microphone element 66*a* inputs internal noise of the camera 1 and converts the input noise into an electrical signal (hereinafter, referred to as a noise signal). The connector 64*b* is connected to the connector 63*c*. The main sound signals from the main microphone elements 63*d* are transmitted to an analog sound processing unit (not illustrated) provided on the main substrate 100 through the lead wires 63*b* and the top surface FPC 64. The noise signal from the reference microphone element 66*a* is transmitted to the analog sound processing unit through the top surface FPC 64.

The analog sound processing unit performs predetermined processing on the main sound signals input from the main microphone elements 63*d* and the noise signal input from the reference microphone element 66*a*, and outputs the processed signals to a digital sound processing unit (not illustrated). The digital sound processing unit filters the noise signal to generate a noise component, and subtracts the noise component from the main sound signals. As a result, a sound signal in which noise is suppressed is generated.

As described above, the main microphone elements 63*d* mainly acquires an external sound, and the reference microphone element 66*a* mainly acquires a sound inside the apparatus.

The microphone/speaker holder 65 includes a plurality of first screw seat surfaces 65*a*, second screw seat surfaces 65*b*, main microphone housing portions 65*c* (65*c*L, 65*c*R), a reference microphone housing portion 65*d*, a speaker housing portion 65*e*, a plurality of hook portions 65*f*, and the like.

The first screw seat surfaces 65*a* are in contact with the first screw seat surfaces 62*a* of the microphone/speaker pressing member 62, and are fixed to the top surface cover

10 with screws. The second screw seat surfaces 65*b* are in contact with the second screw seat surfaces 62*b* and fixed to the top surface cover 10 with screws. The main microphone housing portions 65*c* have cylindrical shapes and house the corresponding main microphone units 63*a*.

The reference microphone housing portion 65*d* has a cylindrical shape and houses the reference microphone unit 66. The speaker housing portion 65*e* has a cylindrical shape and houses the speaker 64*a*. The hook portions 65*f* are used for hooking the lead wires 63*b*, and are appropriately disposed to prevent the lead wires 63*b* from inadvertently moving during assembly or the like.

Figure 5:
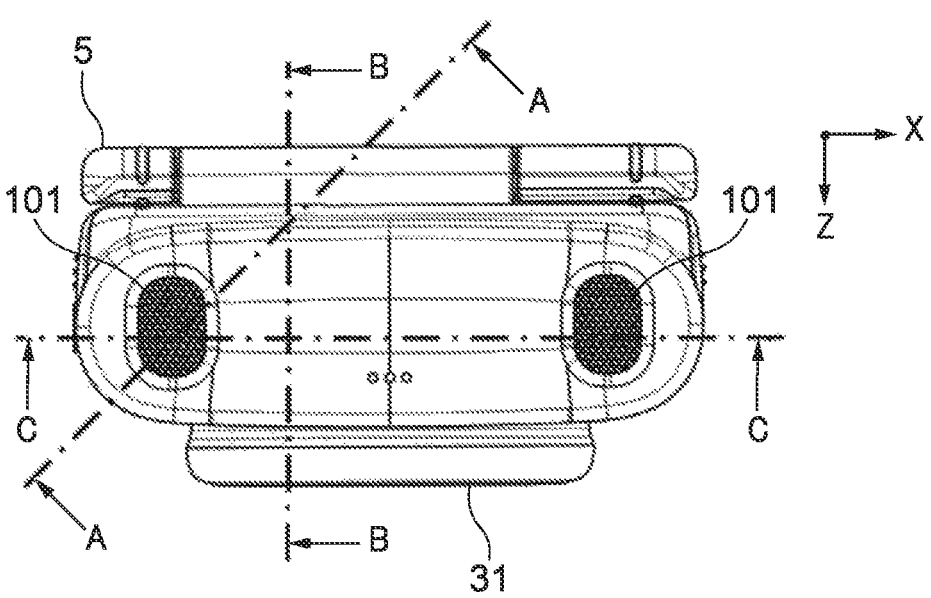
FIG. 5 is a top view of the camera.
Figure 7:
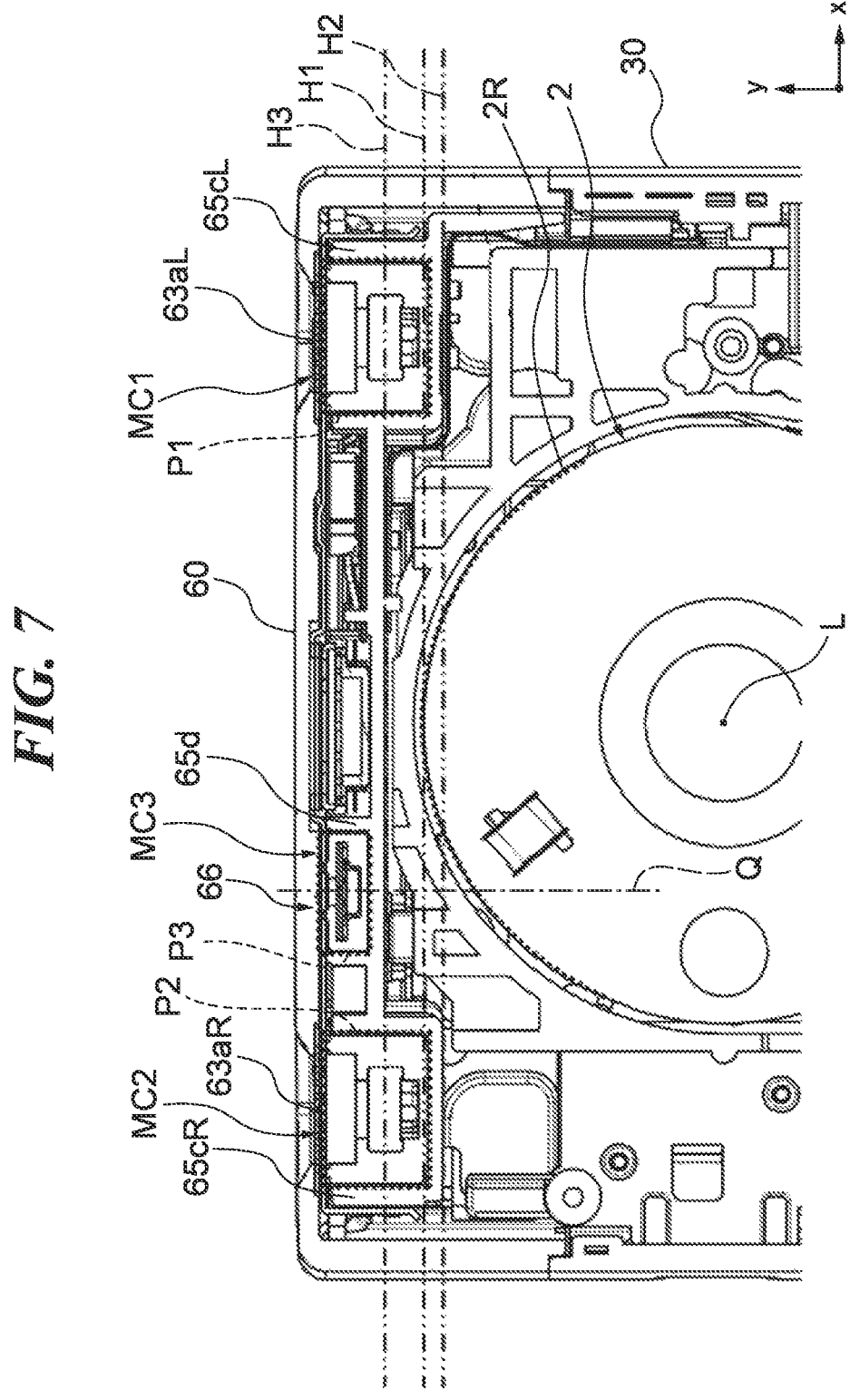
FIG. 7 is a cross-sectional view taken along the line C-C in FIG. 5.

Next, configurations of the main microphone units 63*a* and the reference microphone unit 66 will be described with reference to FIGS. 5 to 7. FIG. 5 is a top view of the camera 1. FIG. 6A is a cross-sectional view taken along the line A-A in FIG. 5. FIG. 6B is a cross-sectional view taken along the line B-B in FIG. 5. FIG. 7 is a cross-sectional view taken along the line C-C in FIG. 5.

As illustrated in FIG. 7, three microphones: a first microphone unit MC1; a second microphone unit MC2; and a third microphone unit MC3 are disposed above the lens barrel unit 2. The first microphone unit MC1 is arranged on the left (+X side) of the optical axis L in a left-right direction when viewed from the −Z side. The second microphone unit MC2 is arranged on the right (−X side) of the optical axis L in the left-right direction when viewed from the −Z side. The third microphone unit MC3 is disposed between the first microphone unit MC1 and the second microphone unit MC2 in the left-right direction when viewed from the −Z side.

FIG. 6A shows a cross section passing through the center of the main microphone element 63*d* and the midpoint of a lead wire pressing portion 63*f*1. FIG. 6A illustrates the second microphone unit MC2. The second microphone unit MC2 includes the main microphone unit 63*a*R, the main microphone housing portion 65*c*R, and an electrical connection portion (solder portion 63*e*, lead wires 63*b*). The main microphone unit 63*a*R includes the main microphone element 63*d*, a microphone bush 63*f*, and a cushion member 63*g*.

Similarly to the second microphone unit MC2, the first microphone unit MC1 includes the main microphone unit 63*a*L, the main microphone housing portion 65*c*L, and the electrical connection portion (solder portion 63*e*, lead wires 63*b*). The main microphone unit 63*a*L includes the main microphone element 63*d*, the microphone bush 63*f*, and the cushion member 63*g* (However, the solder portion 63*e*, the microphone bush 63*f*, and the cushion member 63*g* of the first microphone unit MC1 are not illustrated in the drawing).

As illustrated in FIG. 6B, the third microphone unit MC3 includes the reference microphone unit 66, an electrical connection portion (mounting portion 66*b*, top surface FPC 64 (FIG. 4)), and the reference microphone housing portion 65*d*. The reference microphone unit 66 includes the reference microphone element 66*a* and a microphone bush 66*c*.

Since the first microphone unit MC1 and the second microphone unit MC2 are configured to be bilaterally symmetrical, only the second microphone unit MC2 will be described as a representative of a detailed configuration. In the first microphone unit MC1 and the second microphone unit MC2, components denoted with the same reference numerals have a common configuration.

As illustrated in FIG. 6A, the main microphone element 63*d* is inserted into and incorporated in the microphone bush 63*f*. The microphone bush 63*f* is made of an elastic member such as rubber. By surrounding the main microphone element 63*d* with the microphone bush 63*f*, a vibration noise from an outside is reduced from being recorded.

The lead wires 63*b* are soldered to a bottom surface substrate (not illustrated) of the main microphone element 63*d*. The microphone bush 63*f* is provided with the lead wire pressing portion 63*f*1. When the main microphone unit 63*a* is incorporated into the main microphone housing portion 65*c*, the lead wire holding portion 63*f*1 is folded, and a contact pressure is applied to the lead wires 63*b*. Accordingly, transmission of vibration from the lead wires 63*b* to the main microphone element 63*d* is suppressed. This reduces recording of the vibration noise from the outside along the lead wires 63*b*.

The main microphone element 63*d* is disposed such that a sound hole surface 63*x* thereof faces upward. An annular rib 63*f*2 is provided above the microphone bush 63*f*. A hole 63*f*3 is provided within a ring of the rib 63*f*2 so as not to block the sound hole surface 63*x* of the main microphone element 63*d*.

Furthermore, the microphone bush 63*f* is provided with a cushion member housing portion 63*f*4 for disposing the cushion member 63*g* on the sound hole surface 63*x* of the main microphone element 63*d*. The cushion member 63*g* is disposed, for example, in order to reduce recording of wind noise when the camera 1 is used outdoors. The cushion member 63*g* is made of, for example, a porous urethane material.

The rib 63*f*2 is compressed by the main microphone pressing portion 62*c* (FIG. 4) of the microphone/speaker pressing member 62 when the top surface cover unit 60 is assembled. The rib 63*f*2 has an annular shape. As a result, the main microphone element 63*d* is in a state of being blocked from the outside in an area excluding the hole 63*f*3 and the microphone holes 62*d* (FIG. 4) of the main microphone pressing portion 62*c* in an area inside the ring (inside the rib 63*f*2). As a result, noise generated inside the camera 1, such as lens drive sound, is suppressed from being recorded by the main microphone element 63*d*.

It should be noted that the main microphone element 63*d* preferably has a high S/N ratio in order to clearly record an external main sound, and for example, a large-capacity condenser microphone or the like is suitable for the main microphone element 63*d*. Both of an S/N ratio of the first microphone unit MC1 and an S/N ratio of the second microphone unit MC2 are higher than an S/N ratio of the third microphone unit MC3.

The cross section illustrated in FIG. 6B is a YZ cross section passing through the center of the sound hole of the reference microphone element 66*a*. The microphone bush 66*c* is made of an elastic member such as rubber. By surrounding the reference microphone element 66*a* with the microphone bush 66*c*, the vibration noise from the outside is reduced from being recorded.

The reference microphone element 66*a* is incorporated in the microphone bush 66*c*. The reference microphone element 66*a* is connected to the top surface FPC 64 (FIG. 4) at the mounting portion 66*b*. The microphone bush 66*c* is provided with a lead wire pressing portion 66*c*1. When the reference microphone unit 66 is incorporated into the reference microphone housing portion 65*d*, the lead wire pressing portion 66*c*1 is folded, and the contact pressure is applied to the top surface FPC 64. Therefore, transmission of vibration from the top surface FPC 64 to the reference microphone element 66*a* is suppressed. This reduces recording of the vibration noise from the outside along the top surface FPC 64.

The reference microphone element 66*a* is disposed such that a sound hole surface 66*x* thereof faces upward. An annular rib 66*c*2 is provided above the microphone bush 66*c*. A hole 66*c*3 is provided within the ring of the rib 66*c*2 so as not to block the sound hole surface 66*x* of the reference microphone element 66*a*.

The rib 66*c*2 is compressed by the reference microphone pressing portion 62*e* (FIG. 4) of the microphone/speaker pressing member 62 when the top surface cover unit 60 is assembled. The rib 66*c*2 has an annular shape. Therefore, the reference microphone element 66*a* is blocked from the outside. As a result, the reference microphone element 66*a* can mainly acquire noise inside the camera 1 such as the lens drive sound. It should be noted that, for example, a thin MEMS microphone is suitable for the reference microphone element 66*a* in order to reduce the size.

The cross section illustrated in FIG. 7 is an XY cross section passing through a center of the main microphone unit 63*a*L and a center the main microphone unit 63*a*R. The main microphone unit 63*a*L of the first microphone unit MC1 is arranged in a first space P1 on the upper left of the lens barrel unit 2 in the housing of the camera 1 as viewed from the −Z side. The main microphone unit 63*a*R of the second microphone unit MC2 is arranged in a second space P2 on the upper right of the lens barrel unit 2 in the housing of the camera 1 as viewed from the −Z side. The reference microphone unit 66 of the third microphone unit MC3 is disposed in a third space P3 between the first space P1 and the second space P2 in the left-right direction.

Next, the heights of the microphone units MC1, MC2, and MC3 are defined relative to the bottom surface of the camera 1. The distance of the lower end position of the second microphone unit MC2 from the bottom surface of the camera 1 in the Y direction as viewed from the optical axis direction (direction of the optical axis L) is defined as "height H2 of the lower end position of the second microphone unit MC2". The lower end position of the second microphone unit MC2 is the bottom surface position (lower end position) of the main microphone housing portion 65*c*R. A lower end position of the first microphone unit MC1 and the lower end position of the second microphone unit MC2 are substantially equal (common). Similarly, a height of a lower end position of the third microphone unit MC3 is defined as "height H3". The lower end position of the third microphone unit MC3 is the bottom surface position (lower end position) of the reference microphone housing portion 65*d*. A height of an upper end position of the lens barrel unit 2 is defined as "height H1".

The height H2 is lower than the height H1, and the height H3 is higher than the height H1 (H2<H1<H3). With such a height relationship, the three microphone units can be arranged with high space efficiency as described below.

First, the height of the reference microphone unit 66 in the Y direction is determined by the reference microphone element 66*a* and the upper surface FPC 64. On the other hand, the second microphone unit MC2 includes the cushion member 63*g*, the main microphone element 63*d*, and the solder portion 63*e*, and hence a height of the second microphone unit MC2 in the Y direction is higher than that of the third microphone unit MC3.

The lens barrel unit 2 is disposed across the front surface cover unit 30 and the top surface cover unit 60. An upper portion of the lens barrel unit 2 has the arc shape 2R, and hence there is a restriction on arrangement in a space in an upper area of the top surface cover unit 60. In particular, there is no margin in height above the lens barrel unit 2 at a center in the upper surface cover unit 60 in the X direction.

Therefore, if the microphone units MC1 and MC2 are designed to be accommodated here, a size of the housing increases in the Y direction.

Therefore, in the present embodiment, the microphone units MC1 and MC2 are arranged in the upper left and upper right areas of the lens barrel unit 2 having a relatively large space in the Y direction, and the third microphone unit MC3 is arranged in an area between the microphone units MC1 and MC2. In addition, in the Y direction (height direction), a dimension of the reference microphone element 66a of the third microphone unit MC3 is smaller (thinner) than any dimension of the main microphone elements 63d of the microphone units MC1 and MC2. Therefore, it is easy to arrange the lower end position of the third microphone unit MC3, which has middle position among the three microphone units, at a high position. As a result, it is possible to arrange the third microphone unit MC3 in the area between the microphone units MC1 and MC2 and easily satisfy the relationship of H2<H1<H3. This achieves a space-efficient microphone arrangement.

A center position Q of the third microphone unit in the left-right direction is shifted to the right relative to the optical axis L. Therefore, by disposing the third microphone unit MC3 in a space having a margin compared to a space immediately above the lens barrel unit 2, an increase in the height of the housing is suppressed.

It should be noted that the height of the lower end position of the first microphone unit MC1 and the height of the lower end position of the second microphone unit MC2 may be different. In this case, both the height of the lower end position of the first microphone unit MC1 and the height of the lower end position of the second microphone unit MC2 are preferably lower than the height H1.

Figure 8A:
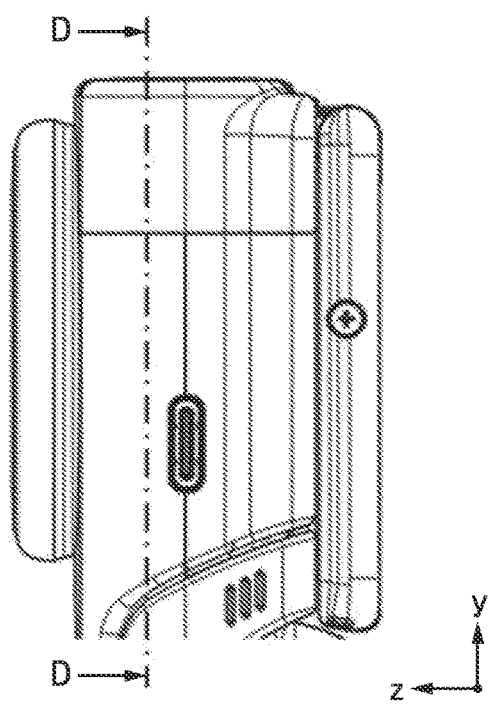
FIG. 8A is a side view of an upper half portion of the camera as viewed from a +X side.
Figure 8B:
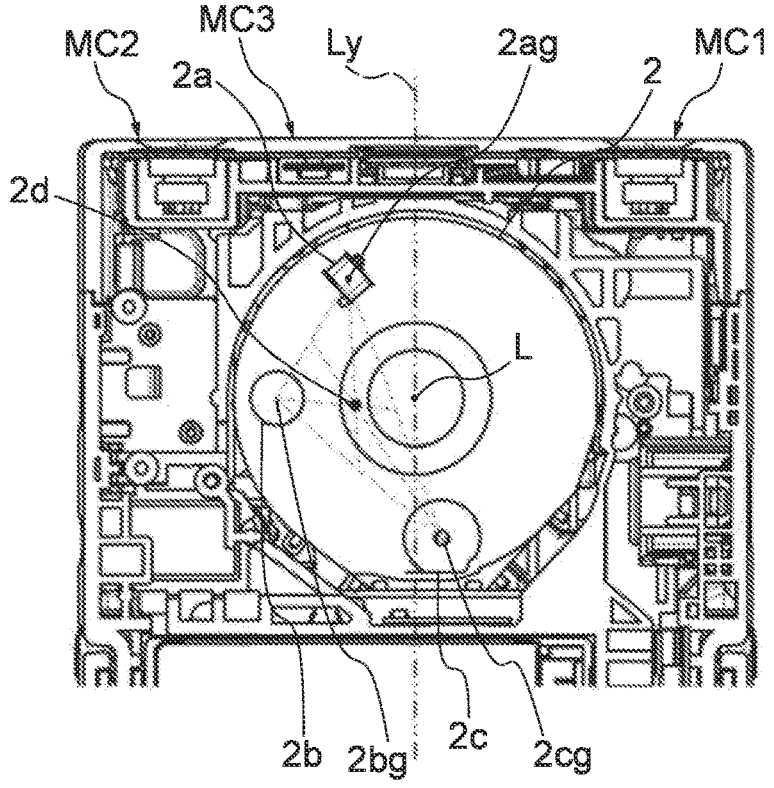
FIG. 8B is a cross-sectional view taken along the line D-D in FIG. 8A.

FIG. 8A is a side view of an upper half portion of the camera 1 as viewed from the +X side. FIG. 8B is a cross-sectional view taken along the line D-D in FIG. 8A.

A total of three actuators including a neutral density (ND) filter drive actuator 2a, a diaphragm blade drive actuator 2b, and an automatic focusing (AF) unit drive actuator 2c are disposed inside the lens barrel unit 2.

A geometric center of a figure (triangle) formed by connecting a center of gravity 2ag of the ND filter drive actuator 2a, a center of gravity 2bg of the diaphragm blade drive actuator 2b, and a center of gravity 2cg of the AF unit drive actuator 2c is referred to as 2d. The geometric center 2d is also a center of gravity of the formed triangle when viewed from the optical axis direction.

Since the purpose of the reference microphone unit 66 is to acquire the noise inside the housing, the reference microphone unit is preferably disposed near three actuators which are main noise sources. Therefore, in the present embodiment, as viewed from the optical axis direction, the third microphone unit MC3 is arranged on the same side as a side on which the geometric center 2d is arranged among the left and right relative to the optical axis L. That is, with respect to a straight line Ly in the Y direction passing through the optical axis L of the lens barrel unit 2, the reference microphone unit 66 is arranged on the right side when the geometric center 2d is located on the right side, and the reference microphone unit 66 is arranged on the left side when the geometric center 2d is located on the left side. In this manner, the reference microphone unit 66 is arranged at a position where noise emitted from the three actuators can be easily acquired.

It should be noted that, in a case where the actuator that generates the largest noise is known in advance, the third microphone unit MC3 may be arranged on the same side among the left and right sides on which the actuator that generates the largest noise is arranged, relative to the optical axis L as viewed from the optical axis direction. Even with this arrangement, the third microphone unit MC3 can easily acquire noise from the actuators.

It should be noted that when there are two actuators, a middle position between centers of gravity of the two actuators as viewed from the optical axis direction may be treated as the geometric center 2d.

According to the present embodiment, in the left-right direction, the first microphone unit MC1 is disposed to the left of the optical axis L, the second microphone unit MC2 is disposed to the right of the optical axis L, and the third microphone unit MC3 is disposed between the first microphone unit MC1 and the second microphone unit MC2. When viewed from the optical axis direction, both the lower end position (H2) of the first microphone unit MC1 and the lower end position (H2) of the second microphone unit MC2 are lower than the upper end position (H1) of the lens barrel unit 2, and the lower end position (H3) of the third microphone unit MC3 is higher than the upper end position (H1) of the lens barrel unit 2. That is, a height relationship of H2<H1<H3 is established. As a result, the three microphone units (MC1, MC2, MC3) can be arranged with the high space efficiency.

In addition, since the center position Q of the third microphone unit in the left-right direction is shifted relative to the optical axis L, the third microphone unit MC3 can be efficiently arranged, and the housing height can be suppressed. It should be noted that, although in the present embodiment, the design in which the center position Q is shifted to the right relative to the optical axis L has been described, the direction in which the center position Q is shifted relative to the optical axis L may be either left or right.

In addition, the back surface grip area 42 and the wireless module 112 are disposed below the lens barrel unit 2 and are far from the microphone units MC1 and MC2. As a result, it is difficult for the microphone unit MC1 and/or the microphone unit MC2 to acquire operation noise generated when operating the back surface grip area 42 and radio signal noise generated in the wireless module 112.

In addition, in the Y direction, the dimension of the reference microphone element 66a is smaller than the dimensions of the main microphone elements 63d. Therefore, the lower end position of the third microphone unit MC3 can be easily disposed at a high position, and the space efficiency can be improved.

In addition, when viewed from the optical axis direction, the third microphone unit MC3 is arranged on the same side as the side on which the geometric center 2d is arranged among the left and right relative to the optical axis L. As a result, since the third microphone unit MC3 can easily acquire the noise inside the housing, the noise component can be efficiently subtracted from the main sound signal.

Moreover, the main microphone elements 63d are held in the main microphone housing portions 65c via the microphone bushes 63f. Furthermore, the reference microphone element 66a is held in the reference microphone housing portion 65d via the microphone bush 66c. As a result, acquisition of the vibration noise from the outside is reduced.

It should be noted that, in the present embodiment, "substantially" is not intended to exclude completeness. For example, "substantially parallel", "substantially equal", "substantially identical", "substantially orthogonal", "substantially at the center", and "substantially rectangular parallelepiped" are intended to include completely parallel, equal, identical, orthogonal, at the center, and rectangular parallelepiped, respectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064315, filed Apr. 11, 2023, which is hereby incorporated by reference wherein in its entirety.

What is claimed is:

1. An image pickup apparatus comprising:
a lens barrel having an optical axis;
a first microphone unit disposed to a left of the optical axis in a left-right direction when viewed from an optical axis direction;
a second microphone unit disposed to a right of the optical axis in the left-right direction; and
a third microphone unit disposed between the first microphone unit and the second microphone unit in the left-right direction,
wherein, when viewed from the optical axis direction, both of a lower end position of the first microphone unit and a lower end position of the second microphone unit are lower than an upper end position of the lens barrel and a lower end position of the third microphone unit is higher than the upper end position of the lens barrel, and
wherein each of the first microphone unit, the second microphone unit, and the third microphone unit includes a microphone element, and
a dimension of the microphone element of the third microphone unit is smaller than both of a dimension of the microphone element of the first microphone unit and a dimension of the microphone element of the second microphone unit, in a height direction of the image pickup apparatus.

2. The image pickup apparatus according to claim 1, wherein a center position of the third microphone unit in the left-right direction is shifted to left or right relative to the optical axis.

3. The image pickup apparatus according to claim 1, further comprising a grip area to be gripped by a user, wherein the grip area is disposed below the lens barrel when viewed from the optical axis direction.

4. The image pickup apparatus according to claim 1, further comprising a wireless device configured to perform wireless communication, wherein the wireless device is disposed below the lens barrel when viewed from the optical axis direction.

5. The image pickup apparatus according to claim 1, wherein
the microphone element of each of the first microphone unit, the second microphone unit, and the third microphone unit is arranged such that the sound hole surface of the microphone element faces upward.

6. The image pickup apparatus according to claim 1, wherein
a cushion member is disposed on each of a sound hole surface of the microphone element of the first microphone unit and a sound hole surface of the microphone element of the second microphone unit.

7. The image pickup apparatus according to claim 1, wherein
each of the first microphone unit and the second microphone unit acquires mainly an external sound, and
the third microphone unit acquires mainly a sound inside the apparatus.

8. The image pickup apparatus according to claim 1, wherein both of an S/N ratio of the first microphone unit and an S/N ratio of the second microphone unit are higher than an S/N ratio of the third microphone unit.

9. The image pickup apparatus according to claim 1, wherein
the lens barrel includes an actuator, and
the third microphone unit is arranged on a same side as a side on which the actuator is arranged among left and right sides relative to the optical axis when viewed from the optical axis direction.

10. The image pickup apparatus according to claim 1, wherein
the lens barrel includes a plurality of actuators, and
the third microphone unit is arranged on a same side as a side, on which a geometric center of a figure formed by connecting centers of gravity of the actuators is arranged, among left and right sides relative to the optical axis when viewed from the optical axis direction.

11. The image pickup apparatus according to claim 1, wherein a lower end position of the first microphone unit and a lower end position of the second microphone unit in a height direction of the image pickup apparatus are substantially equal.

12. The image pickup apparatus according to claim 1, wherein
each of the first microphone unit and the second microphone unit includes a housing portion holding the microphone element, and each of the lower end position of the first microphone unit and the lower end position of the second microphone unit is a lower end position of the housing portion.

13. The image pickup apparatus according to claim 12, wherein the microphone element is held in the housing portion via an elastic member.

14. The image pickup apparatus according to claim 1, wherein the third microphone unit includes a housing portion holding the microphone element, and the lower end position of the third microphone unit is a lower end position of the housing portion.

15. The image pickup apparatus according to claim 14, wherein the microphone element is held in the housing portion via an elastic member.

16. An image pickup apparatus comprising:

a lens barrel having an optical axis;

a first microphone unit disposed to a left of the optical axis in a left-right direction when viewed from an optical axis direction;

a second microphone unit disposed to a right of the optical axis in the left-right direction; and a third microphone unit disposed between the first microphone unit and the second microphone unit in the left-right direction, wherein, when viewed from the optical axis direction, both of a lower end position of the first microphone unit and a lower end position of the second microphone unit are lower than an upper end position of the lens barrel and a lower end position of the third microphone unit is higher than the upper end position of the lens barrel, and wherein each of the first microphone unit and the second microphone unit acquires mainly an external sound, and the third microphone unit acquires mainly a sound inside the apparatus.

17. An image pickup apparatus comprising:

a lens barrel having an optical axis;

a first microphone unit disposed to a left of the optical axis in a left-right direction when viewed from an optical axis direction;

a second microphone unit disposed to a right of the optical axis in the left-right direction; and a third microphone unit disposed between the first microphone unit and the second microphone unit in the left-right direction, wherein, when viewed from the optical axis direction, both of a lower end position of the first microphone unit and a lower end position of the second microphone unit are lower than an upper end position of the lens barrel and a lower end position of the third microphone unit is higher than the upper end position of the lens barrel, and wherein the third microphone unit includes a microphone element and a housing portion holding the microphone element, and the lower end position of the third microphone unit is a lower end position of the housing portion, and the microphone element is held in the housing portion via an elastic member.

* * * * *